United States Patent
Otake

(10) Patent No.: US 10,896,344 B2
(45) Date of Patent: Jan. 19, 2021

(54) INFORMATION PROCESSING APPARATUS, INFORMATION PROCESSING METHOD, AND COMPUTER PROGRAM

(71) Applicant: CANON KABUSHIKI KAISHA, Tokyo (JP)

(72) Inventor: Ritsuko Otake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 16/117,680

(22) Filed: Aug. 30, 2018

(65) Prior Publication Data
US 2019/0073558 A1 Mar. 7, 2019

(30) Foreign Application Priority Data
Sep. 6, 2017 (JP) .................. 2017-171178

(51) Int. Cl.
*G06K 9/46* (2006.01)
*G06T 5/00* (2006.01)
(52) U.S. Cl.
CPC ............ *G06K 9/4661* (2013.01); *G06T 5/001* (2013.01); *G06T 5/008* (2013.01); *G06K 2009/4666* (2013.01)
(58) Field of Classification Search
CPC .......... G06K 9/4661; G06K 2009/4666; G06T 5/008; G06T 5/001
See application file for complete search history.

(56) References Cited

U.S. PATENT DOCUMENTS

| 2013/0124414 | A1* | 5/2013 | Roach | G06Q 20/042 705/44 |
| 2017/0019569 | A1* | 1/2017 | Arakawa | H04N 1/58 |
| 2017/0200057 | A1* | 7/2017 | Hyuga | G06K 9/38 |
| 2017/0289405 | A1* | 10/2017 | Agrawal | G06T 5/007 |
| 2018/0005340 | A1* | 1/2018 | Otake | H04N 1/642 |

FOREIGN PATENT DOCUMENTS

JP 04-290177 A 10/1992

* cited by examiner

*Primary Examiner* — Wesley J Tucker
(74) *Attorney, Agent, or Firm* — Canon U.S.A., Inc. IP Division

(57) ABSTRACT

An aspect of the present disclosure includes acquiring an image representing a shadow component in an image capturing environment, the shadow component being reflected in a multi-valued image obtained by capturing an image of a subject; specifying an area having a luminance greater than a predetermined luminance value, the area being included in the image representing the shadow component acquired in the acquiring; correcting the image in such a manner that a luminance of an outer peripheral area of the specified area deceases; and generating a binary image by performing binarization processing on a pixel value of a pixel of interest in the multi-valued image based on a pixel value at the same coordinates as those of the pixel of interest in the corrected image.

12 Claims, 12 Drawing Sheets

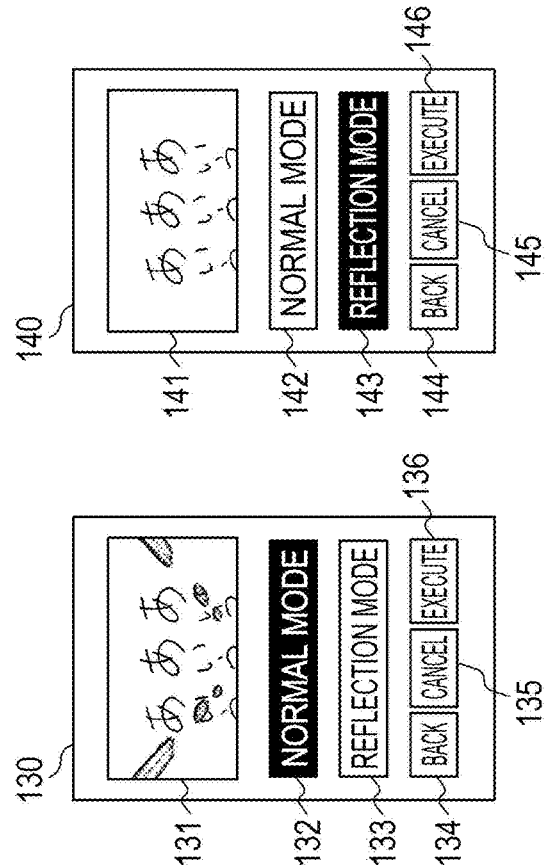
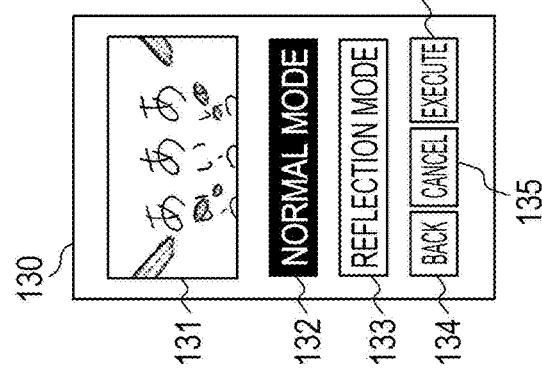
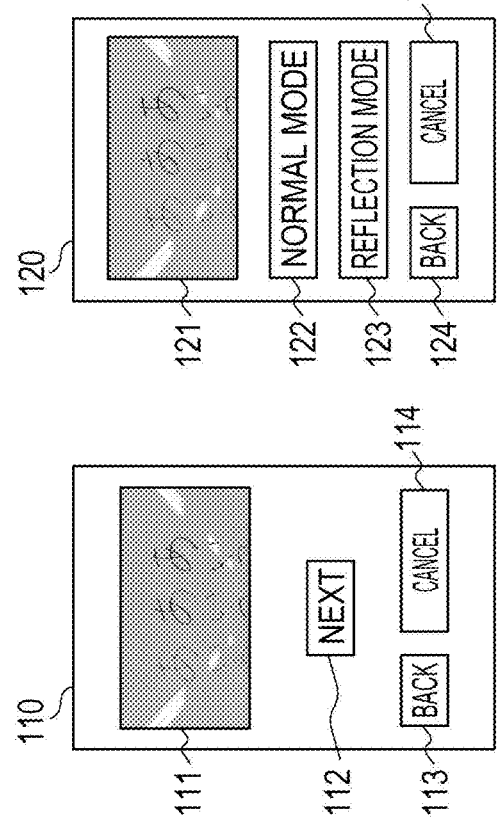
FIG. 10A
FIG. 10B
FIG. 10C
FIG. 10D

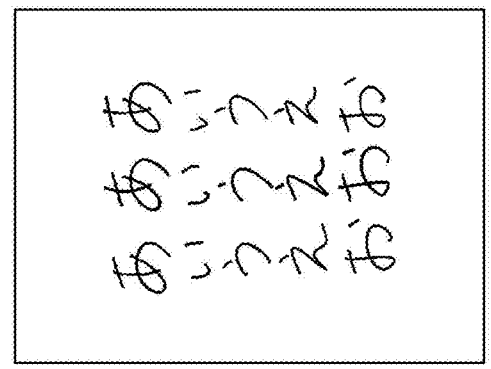
*FIG. 11F*
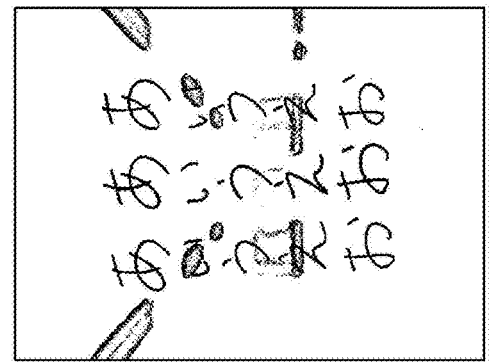
*FIG. 11H*
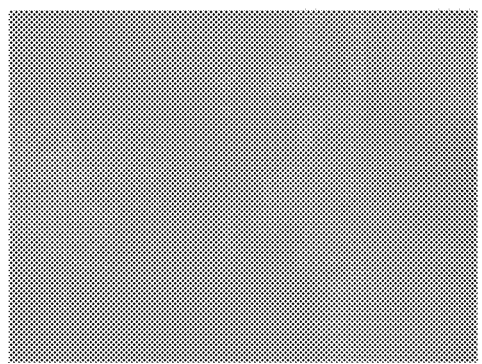
*FIG. 11E*
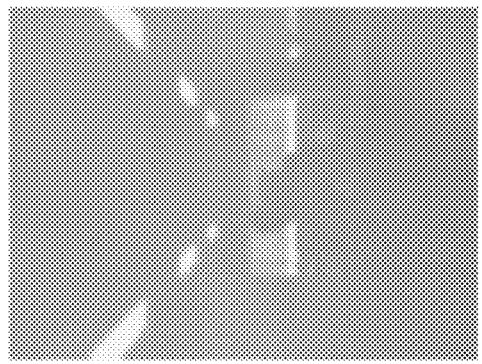
*FIG. 11G*
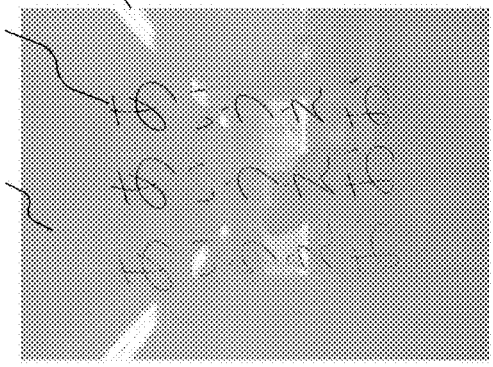
*FIG. 11B*
*FIG. 11C*
*FIG. 11D*
*FIG. 11A*
SHADOW COMPONENT
OBJECT
REFLECTED AREA

INFORMATION PROCESSING APPARATUS, INFORMATION PROCESSING METHOD, AND COMPUTER PROGRAM

BACKGROUND

Field of the Disclosure

The present disclosure relates to an image processing technique for an information processing apparatus.

Description of the Related Art

Binarization processing for converting an image into a monochrome binary image by determining whether each pixel value of input color or gray scale image data is greater than a threshold is known. Japanese Patent Laid-Open No. H04-290177 discusses binarization processing using a single threshold for each pixel of image data.

In Japanese Patent Laid-Open No. H04-290177, a shadow component in an image capturing environment that is reflected in image data is not taken into consideration in binarization processing. Accordingly, when the shadow component included in the image data is darker than the threshold, the shadow component is converted into black as a result of binarization. Therefore, in the case of capturing an image of a document of a blank sheet including a shadow component, the area of the blank sheet is converted into black. If illumination such as fluorescent light is reflected in image data, binarization processing on an outer peripheral area of the illumination cannot be accurately performed.

SUMMARY

According to an aspect of the present disclosure, an information processing apparatus includes an acquisition unit configured to acquire an image representing a shadow component in an image capturing environment in which a multi-valued image obtained by capturing an image of a subject is reflected; a specifying unit configured to specify an area having a luminance greater than a predetermined luminance value, the area being included in an image representing a shadow component acquired by the acquisition unit; a correction unit configured to correct the image in such a manner that a luminance of an outer peripheral area of the area specified by the specifying unit decreases; and a generation unit configured to generate a binary image by performing binarization processing on a pixel value of a pixel of interest in the multi-valued image based on a pixel value at the same coordinates as those of the pixel of interest in the image corrected by the correction unit.

Further features of the present disclosure will become apparent from the following description of exemplary embodiments (with reference to the attached drawings).

BRIEF DESCRIPTION OF THE DRAWINGS

FIGS. 10A to 10D illustrate an operation screen.

FIGS. 11A to 11H illustrate an example of an image under binarization processing.

DESCRIPTION OF THE EMBODIMENTS

Modes for carrying out the present disclosure will be described below with reference to the drawings.

First Exemplary Embodiment

Figure 1:
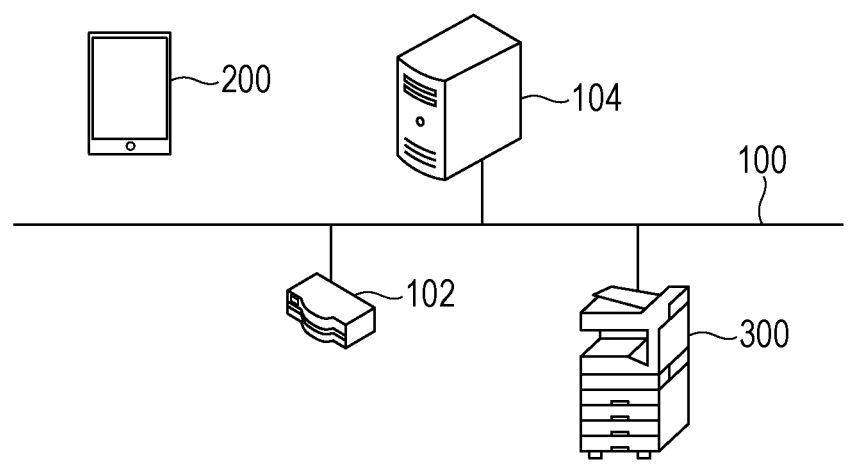
FIG. 1 is a system configuration diagram according to one or more aspect of the present disclosure.

FIG. 1 illustrates an overall configuration of a system suitable for a first exemplary embodiment of the present disclosure. A local area network (LAN) 100 is connected to each of a wireless router 102, a computer 104, and a digital multifunction peripheral 300. A mobile terminal 200 is connected to each of the digital multifunction peripheral 300 and the computer 104 through the wireless router 102 and the LAN 100. The mobile terminal 200 and the digital multifunction peripheral 300 functions as an information processing apparatus in the following exemplary embodiments.

Figures 2A, 2B:
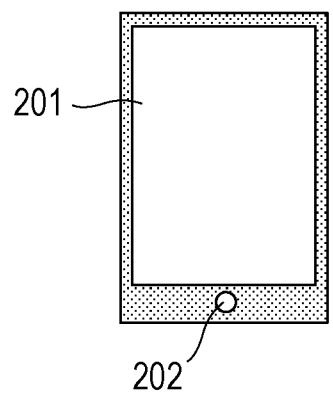
FIGS. 2A and 2B illustrate an example of appearance of a mobile terminal.

FIGS. 2A and 2B illustrate an appearance of the mobile terminal 200 used in the present exemplary embodiment. While there are various types of mobile terminals 200, FIG. 2A illustrates an example of the front surface of the mobile terminal 200. The front surface of the mobile terminal 200 is provided with a touch panel display 201 and an operation button 202. Specifically, the touch panel display 201 is a device including a combination of a display device for displaying information, buttons, images, and the like necessary for operation and a device for inputting a position by being touched by a finger of a human or the like. FIG. 2B illustrates an example of the back surface of the mobile terminal 200. On the back surface of the mobile terminal 200, an image capturing unit 203 is disposed. In the present exemplary embodiment, the mobile terminal 200 can be applied to any terminal device having a camera function including the image capturing unit 203. Specifically, the present disclosure can be applied to a smartphone, a mobile phone, a tablet terminal, and a laptop computer having a camera function, a digital camera having a communication function, and the like. In addition, the present disclosure can be applied to a document camera capable of capturing an image of a document in a non-contact manner.

Figure 3:
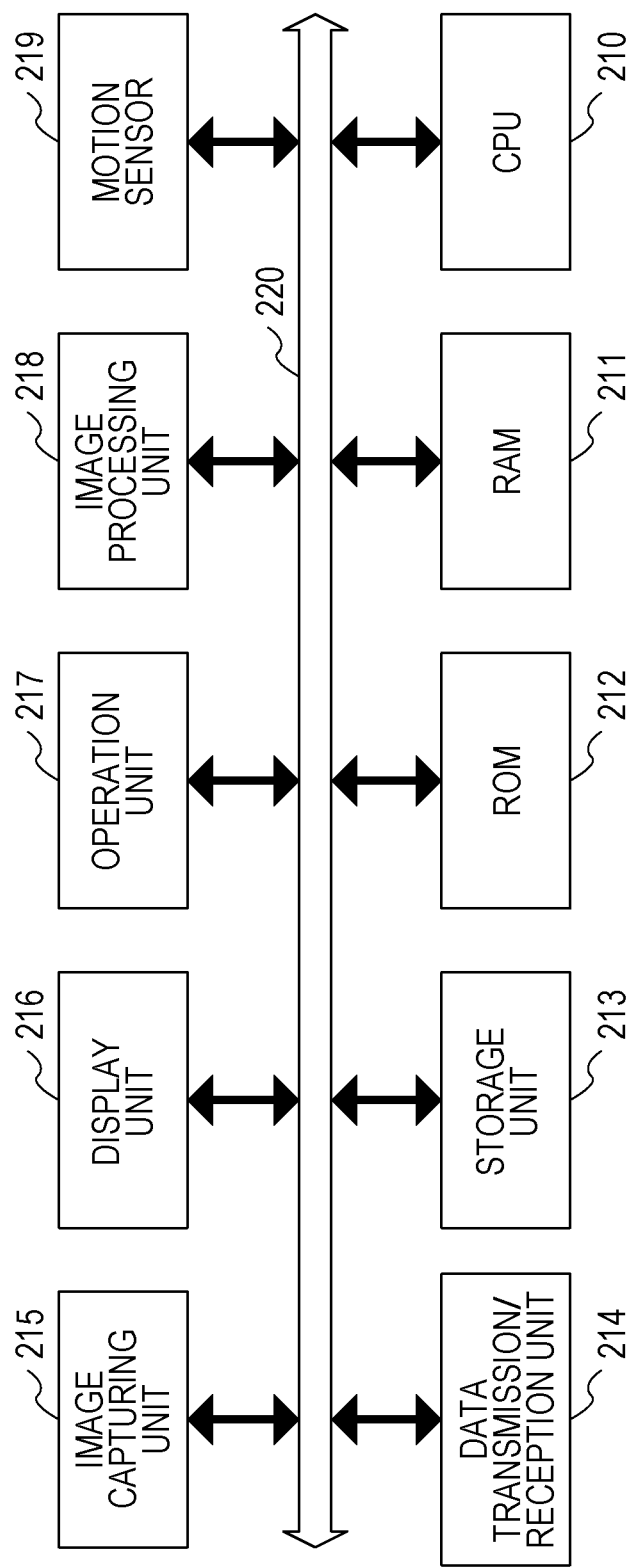
FIG. 3 is a block diagram illustrating the mobile terminal.

FIG. 3 is a block diagram illustrating an internal configuration of the mobile terminal 200. However, this block diagram is an example of a configuration for carrying out the present exemplary embodiment. Referring to FIG. 3, a central processing unit (CPU) 210, a random access memory (RAM) 211, and a read only memory (ROM) 212 transmit and receive programs and data through a data bus 220. The data bus 220 is connected to each of a storage unit 213, a data transmission/reception unit 214, an image capturing unit 215, a display unit 216, an operation unit 217, an image processing unit 218, and a motion sensor 219. These components together with the CPU 210, the RAM 211, and the ROM 212 transmit and receive programs and data.

The storage unit 213 is a flash memory that stores image data and various programs. The data transmission/reception unit 214 includes a wireless LAN controller to implement transmission and reception of data to and from the digital multifunction peripheral 300 and the computer 104 through the wireless router 102. The image capturing unit 215 corresponds to the image capturing unit 203 described above and acquires a captured image by capturing an image of a document. Data on the acquired captured image is processed by the image processing unit 218 and the CPU 210 through the storage unit 213 and the RAM 211. After that, the CPU 210 performs processing on the processed image data, such as display of the processed image data on a display of the display unit 216, storage of the image data in the storage unit 213, and transmission of the image data to an external device through the data transmission/reception unit 214.

The display unit 216 is a display constituting the touch panel display 201 described above. The display unit 216 performs live view display when a camera function is used to capture an image of a document, and displays image processing results according to the present exemplary embodiment, a notification about a processing process, information necessary for operation, and the like.

The operation unit 217 includes a touch panel constituting the touch panel display 201 described above and the operation button 202, receives an operation from a user, and transmits information about the operation.

The motion sensor 219 includes a three-axis acceleration sensor, electronic compass, and a three-axis angular velocity sensor mounted thereon, and is capable of detecting a posture or movement of the mobile terminal 200 by using known techniques.

The CPU 210 executes programs held in the ROM 212 and the storage unit 213 to thereby control components in the mobile terminal 200.

Figure 4:
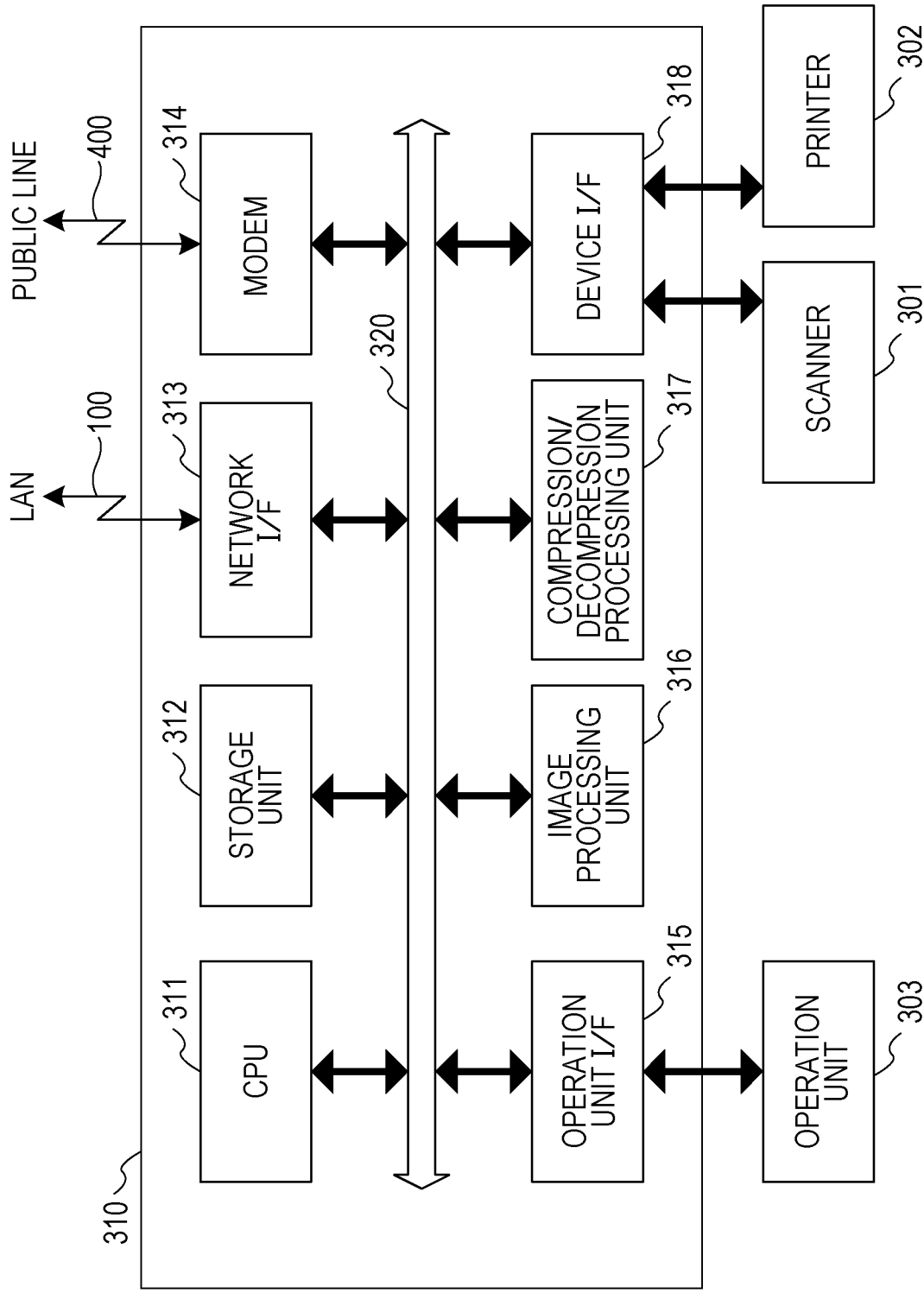
FIG. 4 is a block diagram illustrating a digital multifunction peripheral.

FIG. 4 is a block diagram illustrating an internal configuration of the digital multifunction peripheral 300. However, this block diagram is an example of the configuration for carrying out the present exemplary embodiment. Referring to FIG. 4, a controller unit 310 is connected to a scanner 301 which is an image input device and a printer 302 which is an image output device. The controller unit 310 is also connected to the LAN 100 and a public line 400, and inputs and outputs image data and device information to control the entire system. A CPU 311 functions as a controller that controls the overall digital multifunction peripheral 300. A storage unit 312 stores image data and compressed data and includes a system work memory for allowing the CPU 311 to operate. A network I/F 313 is connected to the LAN 100 to input and output data. A modem 314 is connected to the public line 400 and performs modulation/demodulation processing for transmitting and receiving data. An operation unit I/F 315 is an interface unit with an operation unit 303, and outputs image data to be displayed on a display unit (not illustrated) on the operation unit 303 to the operation unit 303. Further, the operation unit I/F 315 has a function for transmitting information input by the user through the operation unit 303 to the CPU 311. An image processing unit 316 performs correction, processing, and editing on the image data externally input through the scanner 301, the network I/F, or the like. A compression/decompression processing unit 317 compresses and decompresses the image data by a predetermined compression method. A device I/F 318 connects the scanner 301, the printer 302, and the controller unit 310 to each other and performs image data synchronous/asynchronous conversion. The CPU 311, the storage unit 312, the network I/F 313, the modem 314, the operation unit I/F 315, the image processing unit 316, the compression/decompression processing unit 317, and the device I/F 318 are connected to a data bus 320.

The scantier 301 irradiates a document with light, uses a light receiving element, such as a charge-coupled device (CCD) line sensor, to read the reflected light, and converts the light into an electric signal representing an image on the document, thereby generating digital image data. The printer 302 forms an image on a sheet based on image data, and outputs the sheet. Examples of the image formation method used in this case include an electrophotographic method and an inkjet method. However, any format may be used.

The digital multifunction peripheral 300 having the configuration as described above is capable of, for example, printing image data transmitted from the mobile terminal 200 through the wireless router 102 and the LAN 100 by using the printer 302, and transmitting a facsimile through the modem 314.

Figure 5:
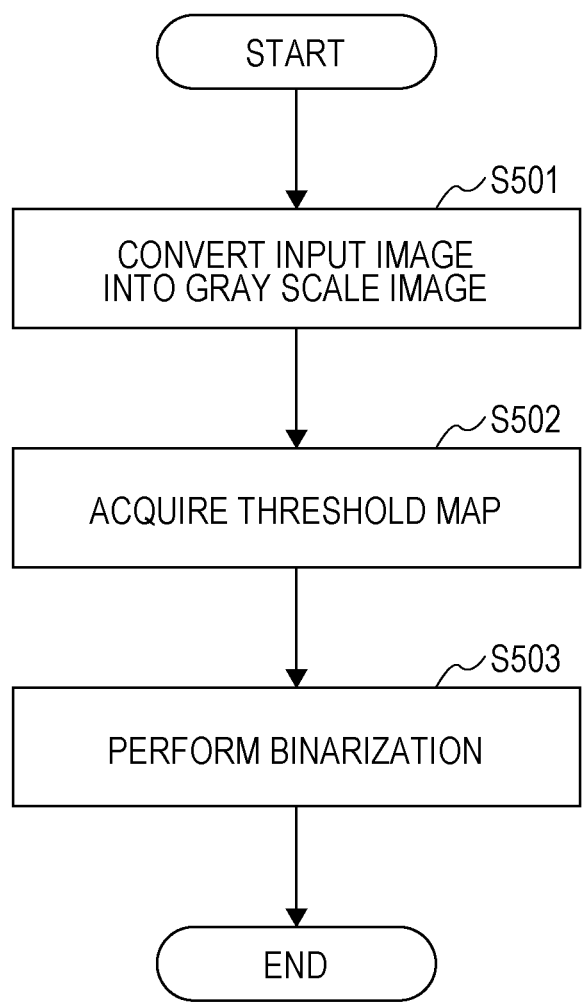
FIG. 5 is a flowchart illustrating a first exemplary embodiment.

FIG. 5 is a flowchart illustrating image binarization processing according to the present exemplary embodiment. When the mobile terminal 200 acquires, as input image, an image captured by the camera function including the image capturing unit 203, an image stored in the storage unit 213, an image received from an external device, or the like, processing is started.

In step S501, the image processing unit 218 converts an input image, which is a multi-valued image, into a gray scale image. If the input image is a gray scale image, the processing of step S501 need not be performed. In step S501, when the input image is a color image with three channels of red (R), green (G), and blue (B), an image with a single channel is generated by mixing the three channels at a predetermined ratio. The mixing ratio used in this case is not particularly limited. For example, a gray scale image is generated by an NTSC weighted average method. The input image used herein refers to an image in which a shadow component in an image capturing environment is reflected in a multi-valued image obtained by capturing a document image.

Next, in step S502, the image processing unit 218 acquires a threshold map. The threshold map refers to an image representing a shadow component in an image capturing environment that is reflected in an input image. In the acquisition of the threshold map, a gray scale image obtained by capturing an image of a blank sheet in an image capturing environment, which is, for example, preliminarily stored in the storage unit 213, may be read. Alternatively, the threshold map may be obtained by analyzing a feature amount relating to a brightness of an input image (multi-valued image) and estimating a shadow component reflected in the input image. In the present exemplary embodiment, assume that the threshold map is estimated mainly based on the input image described above, and threshold map generation processing will be described in detail below with reference to FIG. 7.

Next, in step S503, the image processing unit 218 generates a binary image from the gray scale image and the threshold map. For convenience of description, assume herein that each of the gray scale image and the threshold map is composed of pixel values representing luminance components represented by 8-bit pixels, and a pixel value 0 represents black and a pixel value 255 represents white. Also assume that a binary image to be output is composed of pixel values represented by 1-bit pixels, and the pixel value 0 represents white and a pixel value 1 represents black. Each pixel value of the gray scale image at coordinates (x,y) is represented by g(x,y). Each pixel value in the threshold map is represented by t(x,y). Each pixel value of the binary image to be output is represented by b(x,y), As shown in Formula (1), the image processing unit 218 compares the pixel value g(x,y) of the gray scale image with the pixel value t(x,y) of the threshold map at the same coordinates, thereby determining whether the pixel value b(x,y) of the binary image is 0 (white) or 1 (black) to generate a binary image.

$$\text{when } g(x,y) \geq t(x,y), b(x,y)=0$$

$$\text{when } g(x,y) < t(x,y), b(x,y)=1 \quad \text{Formula (1)}$$

Specifically, when a pixel value representing a luminance component of a pixel of interest in the gray scale image is equal to or greater than a pixel value representing a luminance component at the same coordinates as those of the pixel of interest in the threshold map representing a shadow component, a pixel value representing white is generated. When the pixel value representing the luminance component of the pixel of interest in the gray scale image is smaller than the pixel value representing the luminance component of the pixel of interest in the threshold representing the shadow component, a pixel value representing black is generated. In step S503, binarization processing is performed on all pixels of the gray scale image, thereby generating a binary image.

As described above, binarization suitable for each pixel of the input image is performed using the threshold map.

Figure 6A:
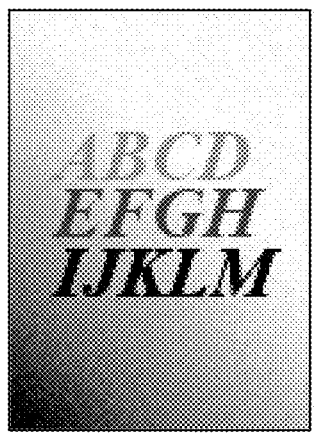
FIGS. 6A to 6C illustrate an example of image binarization processing according to one or more aspect of the present disclosure.
Figure 6B:
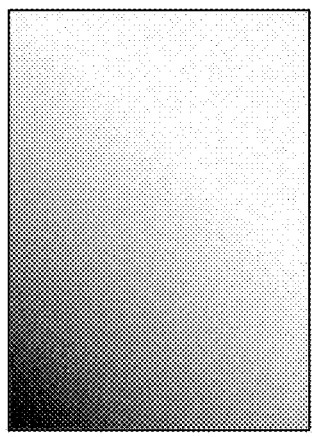
Figure 6C:

FIG. 6A illustrates an input image which is composed of an object (a character string of "A" to "M" in this case) to be reproduced in black during the binarization processing, and a background to be reproduced in white. A lower left portion of an image of a subject is darker than an upper right portion of the image due to the effect of a shadow formed during image capturing, although the background is uniform. The element of nominiformity in brightness caused (hiring image capturing is hereinafter referred to as a shadow component. FIG. 6B illustrates the threshold map corresponding to the input image. FIG. 6C illustrates a result of performing binarization processing on the input image using the threshold map, and also illustrates an example in which a shadow formed during image capturing is not reproduced and only the character string that is an object to be reproduced is converted into black.

Figure 7:
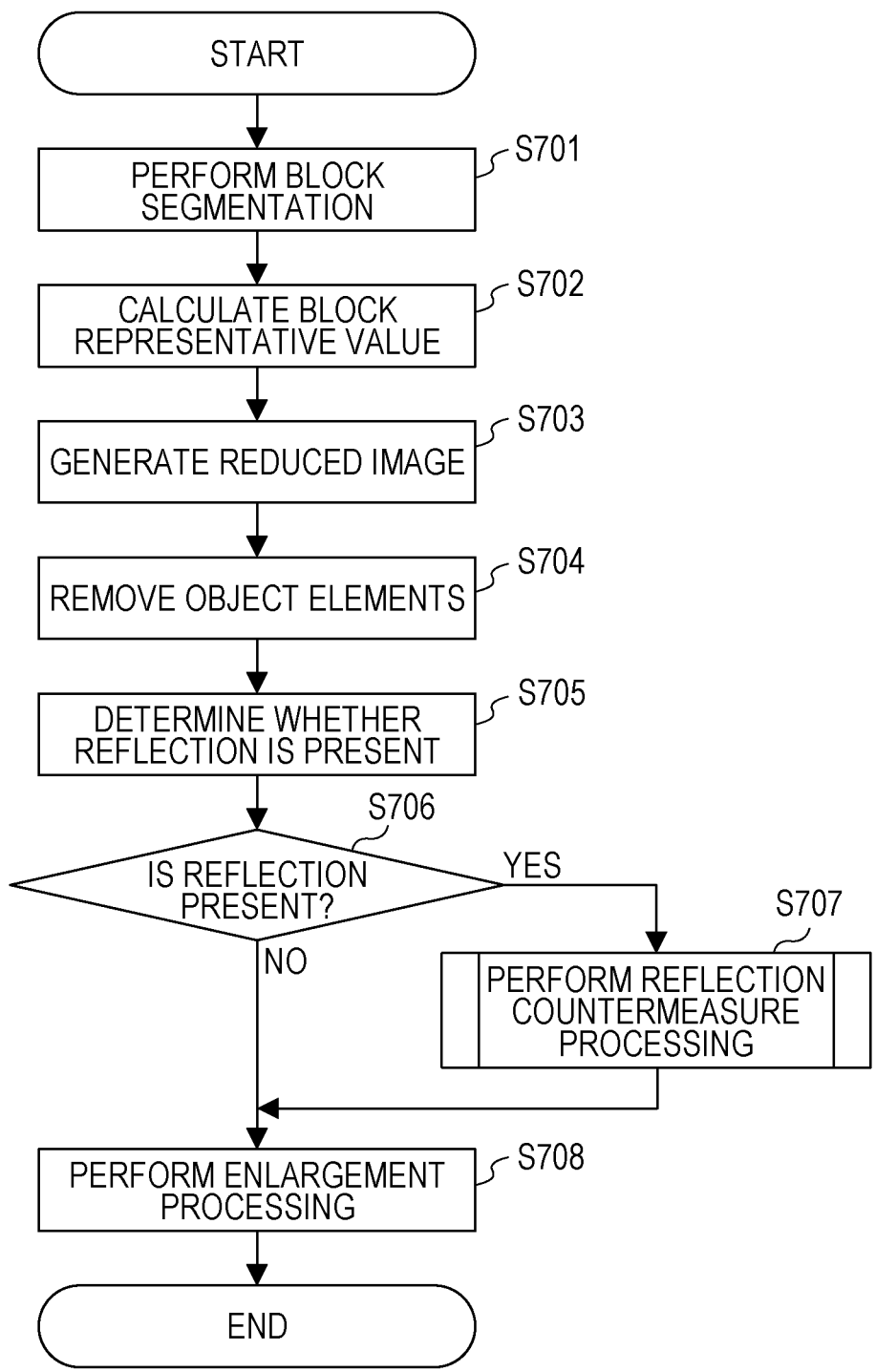
FIG. 7 is a flowchart illustrating threshold map generation processing according to one or more aspect of the present disclosure.

FIG. 7 is a flowchart illustrating a processing flow in which the image processing unit 218 estimates the threshold map based on the input image in step S502 illustrated in FIG. 5.

FIGS. 11A to 11H illustrates an image example for describing the processing of the flowchart illustrated in FIG. 7. FIG. 11A illustrates an input image. The input image includes a bright portion in which illumination light, outside light, or the like is reflected during image capturing. In FIG. 11A, a brighter area due to reflection is described as a reflected area, text or the like to be reproduced in black on a subject is described as an object, and a background with nonuniformity to be reproduced in white is described as a shadow component.

In step S701, the image processing unit 218 segments the input image into a plurality of blocks. In this case, the shape of one block and the number of input pixels included in one block are not particularly limited. For example, one block has a square shape including the same number of input pixels in vertical and horizontal directions, and the number of segmented blocks in vertical and horizontal directions is determined to be about eight to 64. The number of segmented blocks may be fixed or variable depending on conditions for the input image.

Next, in step S702, the image processing unit 218 calculates a representative pixel value in each of segmented blocks. The representative pixel value is determined using relatively bright pixels which are selected from among a plurality of input pixels included in each block. One of the simplest methods for calculating the representative pixel value is a method of determining a brightest pixel value in each block to be the representative pixel value. In another method, a default number of bright pixels are selected in order from the brightest pixel value in each block, and an average value of the selected pixel values is calculated and used as the representative pixel value. In still another method, only pixels having a brightness within a default range are selected from the brightest pixel value in each block, and an average value of the selected pixel values is calculated and used as the representative pixel value. Further, the representative pixel value may be calculated using a pixel value histogram in each block. It is also possible to apply a method in which a cluster representative value is calculated by clustering pixel values in each block and the brightest cluster representative value is used as the representative pixel value. The representative pixel value calculated as described above is substantially equal to the value obtained by adding the shadow component formed during image capturing to the background level itself in a case where the background area of the subject is included in the block. In a case where the background area is not included in the block, the representative pixel value is equal to the value obtained by adding the shadow component to a relatively bright object area in the block.

As a result of obtaining the representative pixel value for all blocks, in step S703, the image processing unit 218 generates a reduced image composed only of the representative value in each block. The image composed only of the representative pixel value in each block is obtained by reducing the input image to an image having a number of pixels defined by the number of segmented blocks described above, and the reduced image is a starting image from which the subsequent shadow estimation processing is started. FIG. 11B illustrates the image generated by reduced image generation processing of step S703 from the input image illustrated in FIG. 11A.

Next, in step S704, the image processing unit 218 removes elements of objects, such as text and pictures, other than the background and shadow, from the reduced image as the starting image, and carries out correction processing for leaving only the shadow component. In this correction processing, the representative pixel value in each block which does not include the background area described above is corrected using the representative pixel value in the adjacent blocks including the background area. As a result, only the value obtained by adding the shadow component to the background level is left in the reduced image. The value of a pixel that is abnormally darker than the entire reduced image or pixel values on the periphery of the pixel is determined to be the representative pixel value in the block with no background area. In this determination, the use of original input image information enables an improvement in the determination accuracy, using color information in addition to the brightness of each pixel value. FIG. 11C illustrates an image obtained by removing object elements from the image illustrated in FIG. 11B by the processing of step S704.

In step S705, the image processing unit 218 determines whether the input image includes a reflected area, such as reflection of illumination, based on the reduced image (FIG. 11C) from which object elements are removed. Various determination methods can be applied. For example, if the number of pixels having a pixel value equal to or greater than a default luminance value with respect to the total number of pixels is equal to or more than a predetermined ratio, it is determined that the input image includes a reflected area. The pixel value having the default luminance value or greater is defined by an abnormally bright pixel value that cannot be acquired in normal image capturing. Specifically, the pixel value is a value of a pixel constituting a blown-out highlight area generated when illumination light or the like is directly or specularly reflected during image capturing. For example, in the case of 8-bit image data, a luminance value of about 250 is suitable. This case is premised on the image captured by the mobile terminal 200 using the camera function including the image capturing unit 203. However, in practice, an image which does not include a shadow, illumination nonuniformity, or the like may be input. In this case, the most part of the image is occupied by default values defined by values substantially equal to the luminance value 250 as the background level. Accordingly, it is determined that there is a reflection, although the image includes no reflected area. To avoid this, it is preferable to set, for example, an upper-limit value for the predetermined ratio of the number of pixels, or an upper-limit value for the entire reduced image, such as an average luminance value, and to provide a unit for changing the determination result to indicate that there is no reflection when such an upper-limit value is exceeded.

In step S706, the image processing unit 218 branches the processing according to the result of the determination as to whether there is a reflection. If it is determined that there is a reflected area, reflection countermeasure processing of step S707 is executed and then the processing proceeds to step S708. If it is determined that there is no reflected area, the processing proceeds to step S703. The reflection countermeasure processing executed in step S707 is processing for correcting a bright area (outer peripheral area) generated at the outer periphery of the reflected area in the reduced image generated by the processing from step S701 to step S704 illustrated in FIG. 7. The outer peripheral area described herein refers to an area in the vicinity of a boundary between a reflected area and a non-reflected area.

Figure 8:
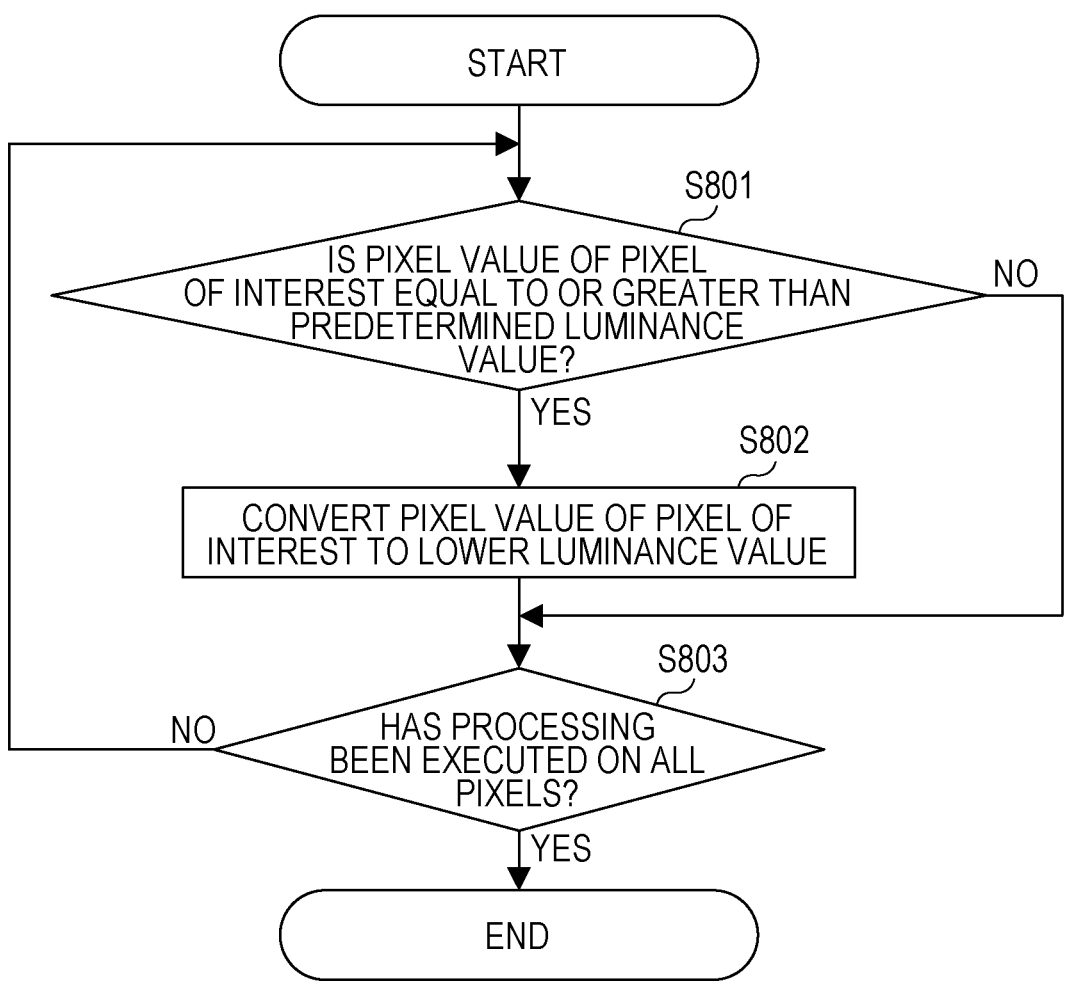
FIG. 8 is a flowchart illustrating reflection countermeasure processing.

FIG. 8 is a flowchart illustrating the reflection countermeasure processing of step S707, and illustrates processing to be sequentially performed on each pixel of the reduced image as the pixel of interest. In practice, the processing is performed by securing an output storage area for the processing in one of the storage unit 213 and the RAM 211. The description of this mechanism is not provided herein.

In step S801, the image processing unit 218 determines whether the pixel value of the pixel of interest is equal to or greater than a predetermined luminance value, and then the processing is branched. If the pixel value is smaller than the predetermined luminance value, the pixel of interest is shifted to the next pixel. If the pixel value indicates a brightness equal to or higher than the predetermined luminance value, the processing proceeds to step S802.

In step S802, the image processing unit 218 converts the pixel value of the pixel of interest into a lower luminance value. This processing method is not particularly limited. For example, processing in which, for example, a pixel value of a pixel of interest is replaced by a darkest pixel value in a range of N×N pixels (e.g., 5×5 pixels) centered on the pixel of interest is applied. Further, a pixel value of a pixel with a brightness equal to or higher than a default value may be replaced by an average luminance value of the reduced image. By the processing of step S802, the outer peripheral area of the reflected area is specified and pixel values in the outer peripheral area are converted into dark pixel values.

In step S803, the image processing unit 218 determines whether the reflection countermeasure processing is executed on all pixels of the reduced image, and repeats the processing of steps S801 and S802 until the processing on all pixels is completed.

FIG. 11D illustrates an image obtained by correcting the image illustrated in FIG. 11C by the reflection countermeasure processing of step S707 described above.

Next, referring again to FIG. 7, in step S708, the image processing unit 218 performs enlargement processing on the reduced image by, for example, a linear interpolation method, so that the number of pixels becomes equal to that of the input image. The enlarged image obtained as a result of the processing is an image having the same size as the input image obtained by adding the shadow component to the background level, and is a threshold map indicating a distribution of separation levels between the background and the foreground that vary within the image. FIG. 11E illustrates an image obtained as a result of enlarging the image illustrated in FIG. 11C when it is determined that there is no reflected area in step S706, i.e., a threshold map. FIG. 11F illustrates an image obtained as a result of enlarging the image illustrated in FIG. 11D when it is determined that there is a reflected area in step S706.

In this manner, the threshold map is generated from the input image.

FIG. 11G illustrates a result of performing binarization processing on FIG. 11A using FIG. 11E as the threshold map. This is an output image when the reflection countermeasure processing of step S707 is not executed, and an unwanted black area appears in a peripheral portion of the reflected area due to reflection of illumination or the like. FIG. 11H illustrates a result of performing binarization processing on FIG. 11A using FIG. 11F as the threshold map. This is an output image when the reflection countermeasure processing of step S707 is executed, and thus is an appropriate result.

Reasons for differences in the output results will be described with reference to conceptual diagrams of FIGS. 12A to 12H.

Figure 12A:
FIGS. 12A to 12H illustrate a binarization threshold.
Figure 12B:

FIG. 12A schematically illustrates an input image, assuming that a reflected area is present at a right end where three black lines are depicted. A thick solid line e-1 in FIG. 12E represents the brightness of this image on a graph. Three lines of the input image are represented by three thick solid lines, respectively, which extend downward (dark side) from the thick solid line e-1 on the graph. FIG. 12B illustrates an ideal threshold map of FIG. 12A and matches the thick solid line e-1 on the graph. When binarization is performed on FIG. 12A using FIG. 12B as the threshold map, as illustrated in FIG. 12F, an image in which three black lines are depicted on a white background is obtained.

Figure 12C:
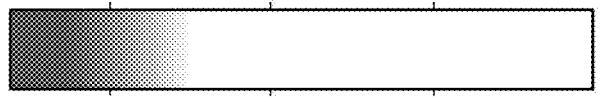

FIG. 12C illustrates a threshold map calculated when the reflection countermeasure processing is not executed. During calculation of the threshold map, the reduced image is generated using bright pixel values in each of segmented blocks. Accordingly, if there is a bright reflected area, the bright area has a property of expanding toward the outside of the bright reflected area. Therefore, a bright area which expands from the right end in FIG. 12C and is wider than the ideal threshold map of FIG. 12B is calculated. A broken line e-0 in FIG. 12E represents the bright area on the graph. The bright area represented by the broken line e-0, which is a threshold, is converted into black by binarization, as compared with the thick solid line e-1 on the graph of the input image. FIG. 12G illustrates a result of binarization in this case. This corresponds to an unwanted black area appearing in FIG. 11G.

Figure 12D:
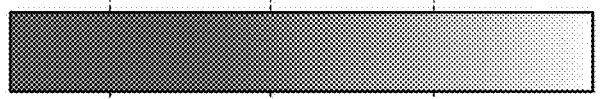
Figure 12E:
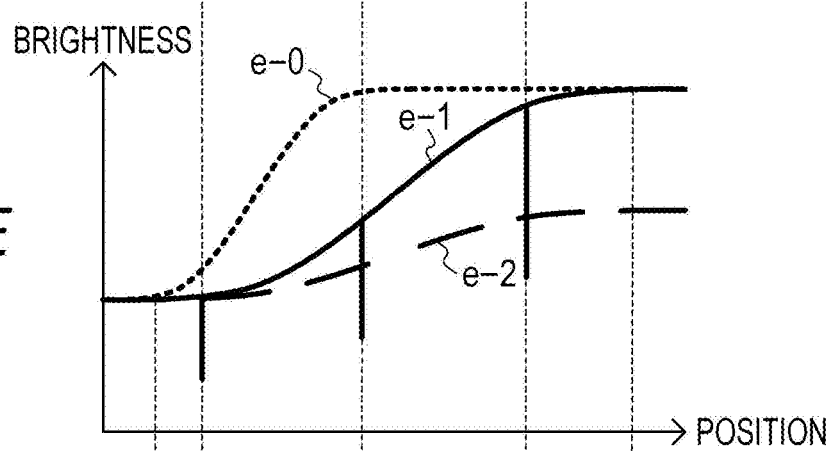
Figure 12F:
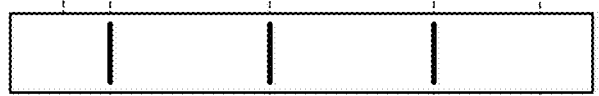
Figure 12G:
Figure 12H:
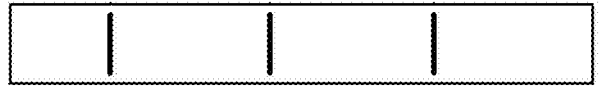

FIG. 12D illustrates a threshold map calculated when reflection countermeasure processing is executed on FIG. 12C. A broken line e-2 in FIG. 12E represents the threshold map on the graph. Only the bright area represented by the broken line e-2, which is a threshold, is converted into black by binarization, as compared with the thick solid line e-1 on the graph of the input image. Accordingly, the binarization result obtained in this case is appropriate as illustrated in FIG. 12H.

While the binarization processing according to the present exemplary embodiment is mainly carried out by the image processing unit 218 mounted on the mobile terminal 200, processing similar to the binarization processing can also be executed by the image processing unit 316 or the CPU 311 on the CPU 210 or the MIT 300. Further, the processing can also be executed by the computer 104, a server (not illustrated) on a network, and the like.

The execution of the processing as described above enables binarization processing with a high image quality by appropriately changing the threshold for binarization within one image even when a shadow component, such as a shadow or nonuniformity, is present in an input image and a bright area is generated in the image due to reflection of illumination or the like.

Second Exemplary Embodiment

A second exemplary embodiment illustrates an operation screen flow for effectively providing threshold map generation processing for binarization described in the first exemplary embodiment. Descriptions of contents of the second exemplary embodiment that are common to the contents of the first exemplary embodiment are not provided herein.

FIG. 10A illustrates an operation screen 110 suitable for a case where threshold map generation processing is performed according to the result of determining, within the apparatus, whether there is a reflection as described in the first exemplary embodiment. An input image to be subjected to binarization processing is displayed in a processing target image display area 111 on the operation screen 110. When the user checks this display and instructs binarization processing, the user presses a "NEXT" button 112. When the "NEXT" button 112 is pressed, if the input image includes a reflected area, a threshold map is generated by automatically executing the countermeasure processing, so that a binary image is generated, and then the processing is terminated. In addition, a "CANCEL" button 114 and a "BACK" button 113 are arranged on the screen, detailed descriptions of which are not provided herein.

Figure 9A:
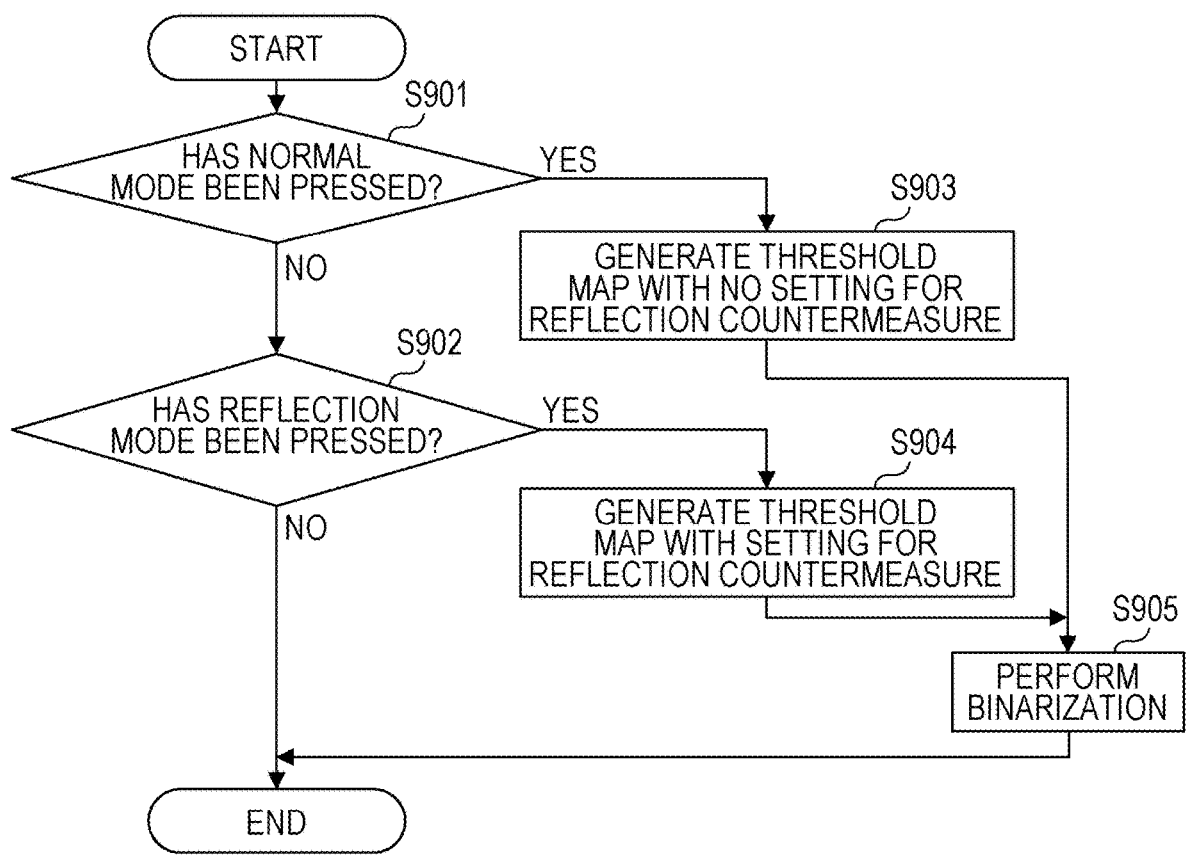
FIGS. 9A and 9B are flowcharts illustrating a relationship between an operation and processing according to one or more aspect of the present disclosure.

FIG. 10B illustrates an operation screen 120 which is configured to enable the user to select valid/valid of reflection countermeasure processing, instead of determining whether there is a reflection in the first exemplary embodiment. An operation and a processing flow for this screen will be described with reference to a flowchart of FIG. 9A.

The user observes the input image to be subjected to binarization processing displayed in a processing target image display area 121, If the image includes no reflection of illumination or the like, the user presses a "normal mode" button 122. If the image includes a reflection of illumination or the like, the user presses a "reflection mode" button 123. Information about the pressed button is transmitted from the operation unit 217. The CPU 210 receives the information and transmits the information as information indicating valid/in valid of reflection countermeasure processing to the image processing unit 218. The image processing unit 218 determines that the "normal mode" button 122 is pressed, the reflection countermeasure processing is invalid, in step S901, the processing proceeds to step S903 to generate a threshold map without reflection countermeasures. The flowchart of FIG. 7 corresponds to processing in which step S705 is not included and the determination result in step S706 indicates "No" without fail. If the "normal mode" button 122 is not pressed in step S901, the processing proceeds to step S902 and the image processing unit 218 determines whether the "reflection mode" button 123 is pressed. If it is determined that the "reflection mode" button 123 is pressed, i.e., the reflection countermeasure processing is valid, the processing proceeds to step S904 to generate a threshold map with reflection countermeasures. The processing to be performed when the "reflection mode" button 123 is pressed corresponds to processing in which step S705 illustrated in FIG. 7 is not included and the determination result in step S706 indicates "Yes" without fail. In step S905, the image processing unit 218 performs binarization processing on the input image using the generated threshold map.

Figure 9B:
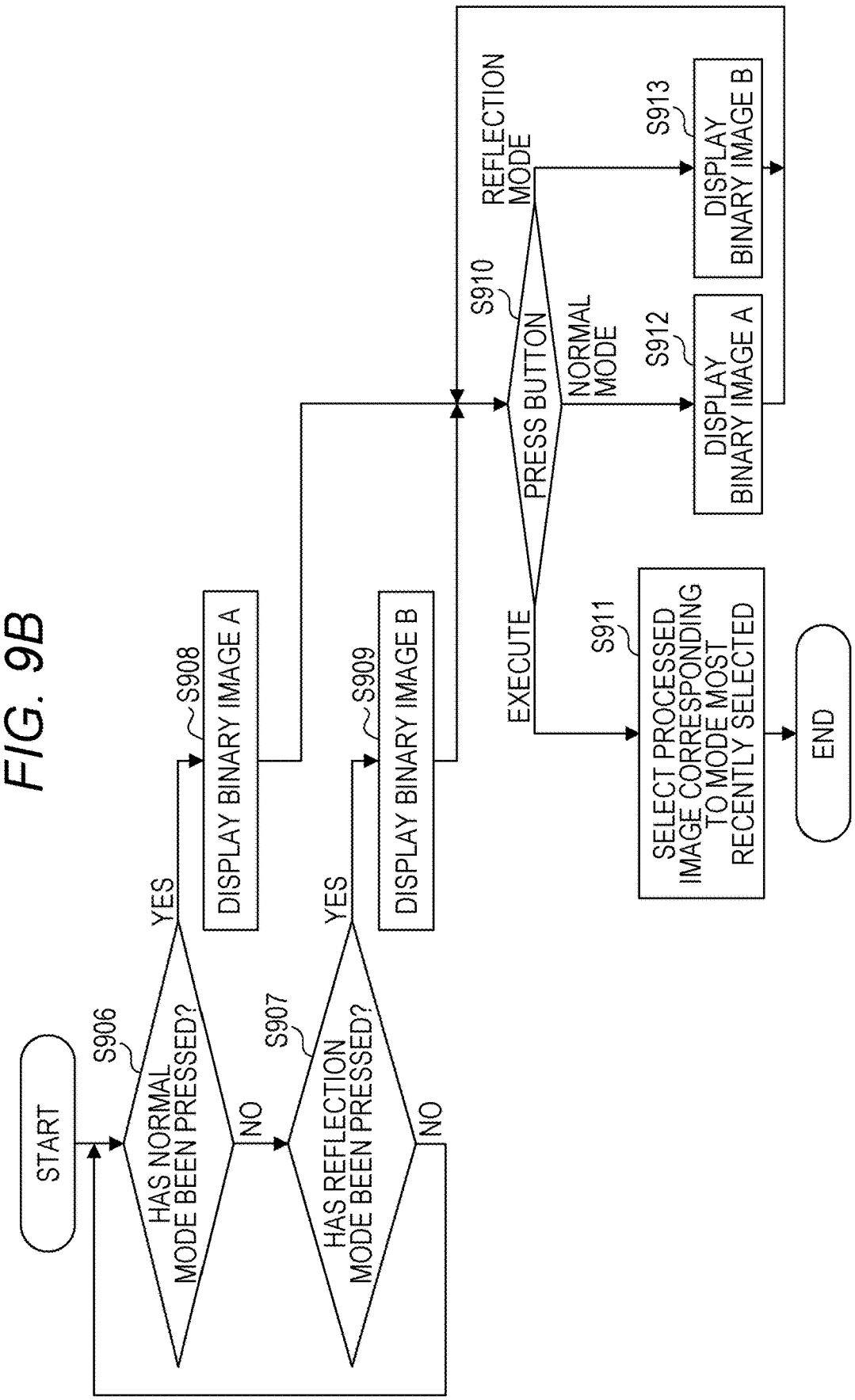

FIGS. 10C and 10D illustrate operation screens 130 and 140, respectively, which are configured to enable the user to select valid/invalid of reflection countermeasure processing while checking a binarization result image. An operation and a processing flow relating to these screens will be described with reference to a flowchart of FIG. 9B.

In the case of carrying out the operation flow, the image processing unit 218 generates threshold maps, which respectively represent the presence and absence of reflection countermeasures, in advance, generates binary images processed using the threshold maps, respectively, and temporarily stores the two types of binary images in the storage unit 213. For convenience of description, assume herein that an image subjected to binarization processing using the threshold map with no reflection countermeasures is referred to as a binary image A and an image subjected to binarization processing using the threshold map with reflection countermeasures is referred to as a binary image B.

In steps S906 and S907, like in steps S901 and S902 described above, the CPU 210 waits until the "normal mode" button 122 and the "reflection mode" button 123 on the screen 120 are pressed and information is transmitted from the operation unit 217. When the "normal mode" button 122 is pressed, the processing proceeds to step S908 from step S906 and the CPU 210 sends an instruction to display the binary image A on the display unit 216. FIG. 10C illustrates the operation screen to be displayed in this case. The binary image A is displayed in an image display area 131 and the "normal mode" is selected. When the "reflection mode" button 123 is pressed, the processing proceeds to step S909 from step S907 and the CPU 210 sends an instruction to display the binary image B on the display unit 216. FIG. 10D illustrates the operation screen to be displayed in this case. The binary image B is displayed in an image display area 141 and the "reflection mode" is selected.

In step S910, the CPU 210 waits until a button on the screen 130 or the screen 140 is pressed. If an "EXECUTE" button 136 or 146 is pressed, the processing proceeds to step S911. The CPU 210 selects the binary image corresponding to the previously selected mode and transmits the information to the image processing unit 218. Thus, a series of processes are terminated. For example, when the "EXECUTE" button 136 is pressed in a state where the screen 130 is displayed, the binary image A is selected. When an "EXECUTE" button 146 is pressed in a state where the screen 140 is displayed, the binary image B is selected. If the "normal mode" button 132 or 142 is pressed in step S910, the processing proceeds to step S912 and the CPU 210 sends an instruction to display the binary image A, i.e., the screen 130, on the display unit 216. If the "reflection mode" button 133 or 143 is pressed, the processing proceeds to step S913 and the CPU 210 sends an instruction to display the binary image B, i.e., the screen 140, on the display unit 216.

The provision of the operation unit as described above enables switching of processing based on the user's determination, for example, as to whether a target image includes a reflected area due to illumination light or outside light.

According to the present disclosure, it is possible to perform binarization processing with a high image quality while suppressing the effect of a shadow component even when the shadow component and illumination light and the like are reflected in a multi-valued image obtained by capturing a document image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s), The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-171178, filed Sep. 6, 2017, which is hereby incorporated by reference herein in its entirety.

What is claimed is:
1. An information processing apparatus comprising:
at least one memory that stores a set of instructions; and
at least one processor that executes the instructions, the instructions, when executed, causing the information processing apparatus to perform operations comprising:
generating shading image data by estimating a shading component arising from an image capturing environment, the shading component being reflected in a multi-valued image data, based on the multi-valued image data obtained by capturing an image of a subject;
specifying an area having a luminance greater than a predetermined luminance value, the area being included in the shading image data;
correcting the shading image data in such a manner that a luminance of the area specified in the shading image data decreases; and
a generation unit configured to generate a binary image by performing binarization processing on a pixel value of a pixel of interest in the multi-valued image data based on a pixel value at the same coordinate point as that of the pixel of interest in the corrected shading image data,
wherein, in the binarization processing on the pixel value of the pixel of interest in the generating, a threshold that depends on the pixel value at the same coordinate point as that of the pixel of interest in the corrected shading image data is used.

2. The information processing apparatus according to claim 1, wherein the correction unit corrects the shading image data by replacing a pixel value of the pixel of interest included in the outer peripheral area with a pixel value with a lowest luminance value in an area of N×N pixels centered on the pixel of interest.

3. The information processing apparatus according to claim 1, wherein the correction unit corrects the luminance of the outer peripheral area to reach an average luminance value of the shading image data for which the shading component arising from the image capturing environment is estimated.

4. The information processing apparatus according to claim 1, wherein, in a case where a pixel value representing a luminance component of the pixel of interest in the multi-valued image data is equal to or greater than a pixel value representing a luminance component of the pixel of interest in the shading image data corrected by the correction unit, the generation unit generates a pixel value representing white from the pixel of interest in the multi-valued image data.

5. The information processing apparatus according to claim 1, wherein, in a case where a pixel value representing a luminance component of the pixel of interest in the multi-valued image data is smaller than a pixel value representing a luminance component of the pixel of interest in the shading image data corrected by the correction unit, the generation unit generates a pixel value representing black from the pixel of interest in the multi-valued image data.

6. The information processing apparatus according to claim 1, wherein the pixel value of the multi-valued image data includes the shadow component in the shading image data capturing environment.

7. The information processing apparatus according to claim 1, wherein the multi-valued image data is a gray scale image.

8. An processing method comprising:
generating shading image data by estimating a shading component arising from an image capturing environment, the shading component being reflected in a multi-valued image data, based on the multi-valued image obtained by capturing an image of a subject;

specifying an area having a luminance greater than a predetermined luminance value, the area being included in the shading image data;

correcting the shading image data in such a manner that a luminance of the area specified in the shading image data decreases; and generating a binary image by performing binarization processing on a pixel value of a pixel of interest in the multi-valued image data based on a pixel value at the same coordinate point as these of the pixel of interest in the corrected shading image data, wherein, in the binarization processing on the pixel value of the pixel of interest in the generating, a threshold that depends on the pixel value at the same coordinate point as that of the pixel of interest in the corrected shading image data is used.

9. A non-transitory computer readable storage medium storing a program executable by a computer to perform an image processing method comprising the steps of:

generating shading image data by estimating a shading component arising from an image capturing environment, the shading component being reflected in a multi-valued image data, based on the multi-valued image obtained by capturing an image of a subject;

specifying an area having a luminance greater than a predetermined luminance value, the area being included in the shading image data;

correcting the shading image data in such a manner that a luminance of the specified area in the shading image data deceases; and generating a binary image by performing binarization processing on a pixel value of a pixel of interest in the multi-valued image data based on a pixel value at the same coordinate point as these of the pixel of interest in the corrected shading image data, wherein, in the binarization processing on the pixel value of the pixel of interest in the generating, a threshold that depends on the pixel value at the same coordinate point as that of the pixel of interest in the corrected shading image data is used.

10. The image processing method according to claim 8, further comprising:

converting the multi-valued image data obtained by capturing the image of the subject into grayscale image data;

performing downscaling processing on resolution of the grayscale image data to generate downscaling image data that is lower in resolution than the multi-valued image data, wherein the shading image data for which the shading component arising from the image capturing environment is estimated is generated based on the downscaling image data; and converting, by upscaling, the shading image data into resolution corresponding to the multi-valued image data;

wherein, in the generating, the converted shading image data is acquired as the corrected shading image data and is used for the binarization processing.

11. The image processing method according to claim 10, wherein in the downscaling processing, (1) processing of performing block segmentation of the grayscale image, (2) processing of selecting one pixel value as a representative value in accordance with a predetermined condition for each of segmented blocks, and (3) processing of generating first image data made up of the representative values selected respectively for the segmented blocks are performed, and wherein, based on a pixel value of a pixel of interest of the downscaling image data and a pixel value of a neighboring pixel adjacent to the pixel of interest, the shading image data is obtained by correcting a pixel value of a pixel of interest determined to have a large change in shading based on a pixel value corresponding to the neighboring pixel.

12. The image processing method according to claim 8, wherein the method is a method for a mobile terminal, and the multi-valued image data is obtained by an image capturing device of the mobile terminal.

* * * * *